Nov. 4, 1930.  S. PAUL  1,780,718
FUNERAL CAR
Filed July 22, 1929  2 Sheets-Sheet 1
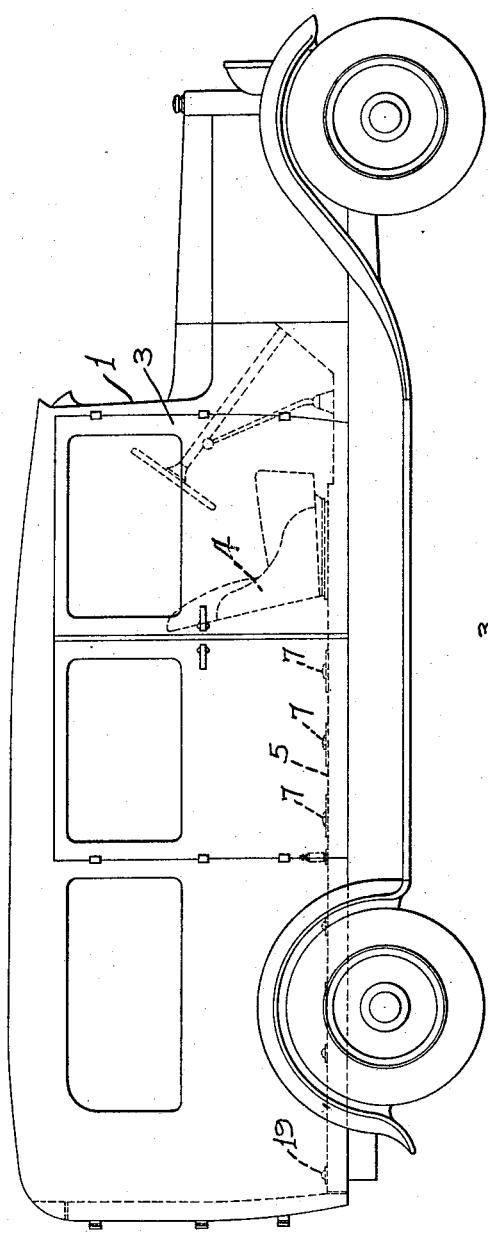
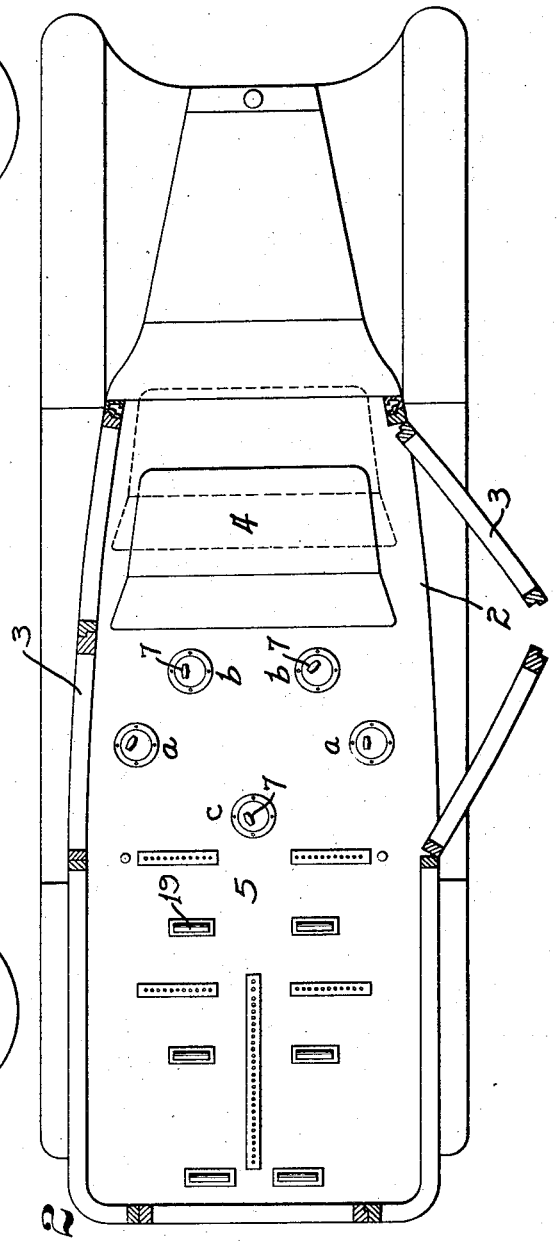
Inventor
SYDNEY PAUL
By Owen & Owen,
Attorneys.

Nov. 4, 1930.   S. PAUL   1,780,718
FUNERAL CAR
Filed July 22, 1929   2 Sheets-Sheet 2

Inventor
SYDNEY PAUL
By Owen T Owen,
Attorneys

Patented Nov. 4, 1930

1,780,718

UNITED STATES PATENT OFFICE

SYDNEY PAUL, OF LIMA, OHIO, ASSIGNOR TO SUPERIOR BODY COMPANY, OF LIMA, OHIO, A CORPORATION OF OHIO

FUNERAL CAR

Application filed July 22, 1929. Serial No. 380,082.

This invention relates to funeral cars, and particularly to those of the type having side loading doors for the caskets.

In the use of cars of this character, the casket is inserted lengthwise therein through a side door opening with its longitudinal axis or major dimension disposed at an angle to that of the car, thereby necessitating some manipulation of the casket in guiding and placing it in a proper position in the car. This manipulation is rendered difficult, especially when handling large and heavy caskets, as the guiding usually has to be done by one person.

The object of my invention is to facilitate the positioning of caskets in funeral cars of this character by the provision on the floor thereof, adjacent to the side entrance doors, of improved anti-friction supporting means for the caskets which will enable large and heavy caskets to be easily moved and guided by one person into desired position within the car.

The invention is fully described in the following specification, and while, in its broader aspect, it is capable of embodiment in numerous forms, a preferred embodiment thereof is illustrated in the accompanying drawings, in which,—

Figure 3:
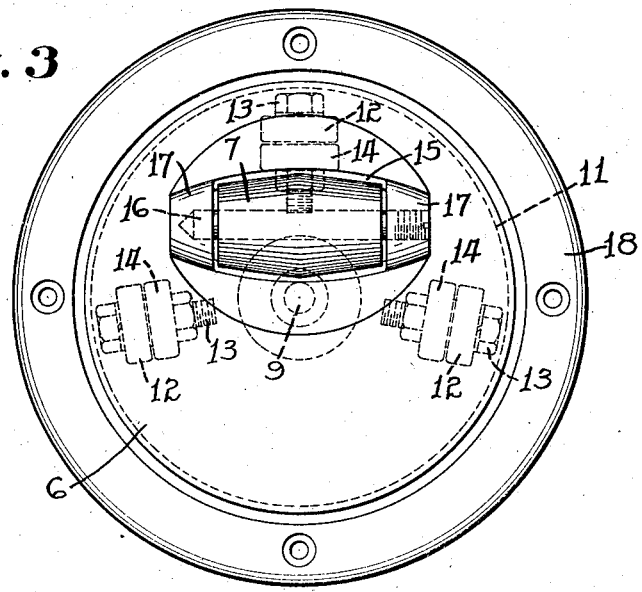
Figure 4:
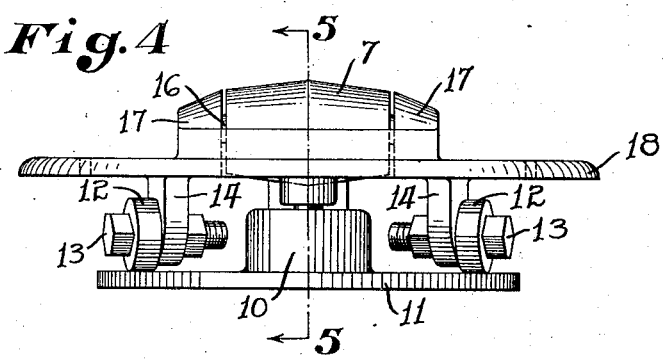
Figure 5:
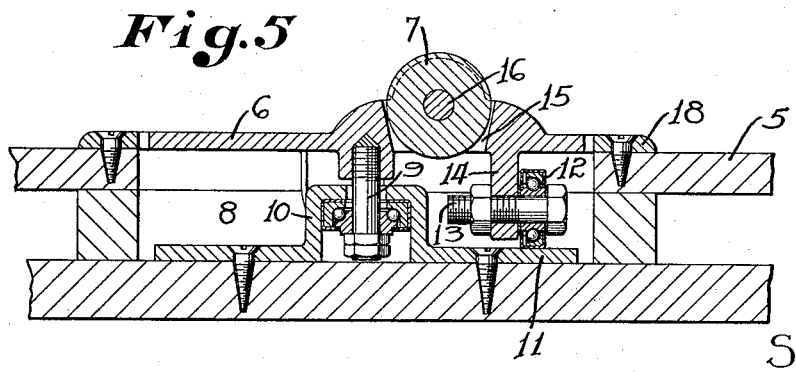

Figure 1 is a side elevation of a car embodying the invention. Fig. 2 is a plan view thereof with the body in horizontal section and with a side door partly open. Fig. 3 is an enlarged plan of a casket-supporting turn-table embodying the invention. Fig. 4 is a side elevation thereof, and Fig. 5 is a section on the line 5—5 in Fig. 4, showing a fragmentary portion of the floor structure in which the turn-table is mounted.

Referring to the drawings, 1 designates a funeral car having a loading opening 2 at one or both sides thereof near the forward end of the casket-receiving compartment and closed by doors 3. The driver's seat 4 is preferably of the shiftable type to enable it to be moved forward and thereby provide greater unobstructed space in the forward part of the car when loading.

Arranged in or on the floor structure 5 of the casket-receiving compartment of the car at the rear of the seat 4 and in adjacent relation to the side openings 2, are a plurality of small turn-tables 6, in the present instance five in number, each mounted for free turning movements relative to the floor and each carrying a casket engaging roll 7 on its top in offset relation to its turning axis.

Each turn-table 6 is mounted over a recess 8 in the floor structure (see Fig. 5), and its pivot pin 9 is anchored to, and mounted for free turning movements in, a bearing member 10 mounted on the bottom of the recess. The member 10 is provided at its base with a radially disposed annular flange for forming a smooth, annular race-way for a set of anti-friction supporting rollers 12 for the turn-table. These rollers are, in the present instance, three in number for each table, and positioned around the table axis, each being mounted on a pin or bolt 13 carried by a lug 14 depending from the underside of the table 6.

The casket-engaging roll 7, which performs a very important part in the proper functioning of the turn-table, is disposed in an opening 15 in the turn-table and is mounted for free turning movements on a pivot pin 16 mounted at its ends in bearing lugs 17 rising from the table at the ends of the opening 15. This pin is horizontally disposed with its axis tangential to a circle concentric to the turning axis of the table so that the movement in any direction of an object over the table, while resting on its roll 7, will cause the table to swing in caster fashion to place the roll at the side of the table axis in the line of movement, and adjacent to the point toward which the movement is taking place.

The roll 7 is of axially elongated form and tapers, or is gradually reduced in diameter, from its center outwardly to each end so as to provide an annular ridge or enlargement at its center in a radial line of the table axis. It is found that the provision of this central enlargement on the roll very greatly facilitates the movement of heavy objects in any or varying directions over the table. The inner sides of the bearing lugs 17 are preferably flush with the respective sides of the roll and are tapered off outwardly from said sides as shown. One of the table rollers 12 is disposed in the radial line of the table in which the central enlargement of the roll 7 is disposed, thereby causing such roller to receive and oppose the direct thrust of an object against the roll 7 when moved thereover. The other two rollers 12, 12 are disposed at opposite sides of the table axis slightly to the rear of a diametrical line parallel to the axis of the roll 7.

The marginal edge of the recess 8 is faced with a ring 18 which has its surface flush with that of the table 6 which turns therein.

It is found preferable to so arrange the turn-tables 6 within the car that one is disposed adjacent to each side opening 2 near the rear portion of such opening, as indicated at $a$; another turn-table is placed slightly forwardly and inwardly from each turn-table position $a$, as indicated at $b$, and the fifth turn-table is disposed in the longitudinal center line of the car, slightly to the rear of the positions $a$, as indicated at $c$.

In placing a casket in the car through either side opening 2 thereof, the doors for such opening are thrown to open position and the seat 4 is moved forward to allow greater free space within the car adjacent to the opening. One end of the casket is then inserted through the side opening at an angle to the longitudinal axis of the car, and such end is permitted to rest on one or both of the turn-tables in the respective positions $a$, $b$. The pall bearers at the outer end of the casket push the casket into the car while a single person at the car end of the casket is enabled by reason of the several turn-tables to easily guide the casket into proper position in the car. When the casket is moved in contact with the supporting roll 7 of any of the turn-tables such turn-table will be instantly caused to turn to a position in which the roll 7 is disposed at the side of the table axis away from which the supported portion of the casket is being moved, and this turning action of the table is very greatly facilitated by the form of the roll 7, as shown. It is found in practice that the arrangement of the turn-table in the sets $a$, $b$, $c$, as shown, is very efficient in effecting a proper supporting of the casket while being guided into position in the car. When the casket has been guided by the aid of the turn-tables to a position lengthwise of the car its rear end, with respect to the car, is supported by the customary rolls 19, which are provided in the floor structure in the rear end portion of the car.

It will be understood that my invention is not limited to any specific construction, arrangement or form of the parts, as it is capable of numerous modifications without departing from the spirit of the claims.

Having thus described my invention, what I claim as new and desire to secure by Letters Patent, is:

1. In a funeral car having a side opening for the introduction of a casket, a set of three turn-tables mounted in the floor structure of the car, one turn-table being disposed adjacent to said opening near the rear end thereof, another being mounted slightly inwardly and forwardly with respect to said first turn-table, and another being mounted rearwardly of the first turn-table and substantially in the longitudinal center line of the car, said turn-tables each adapted for free turning movements in the floor plane of the car and having a casket supporting roll at its top portion in off-set relation to the table axis with its axis tangential to a circle concentric to the table axis.

2. In a funeral car having a side entrance opening for a casket, a plurality of turn tables near said opening and mounted for free turning movements about axes perpendicular to the floor of the car, each of said tables being provided with supporting rolls at its under side distributed about the axis of the table and with a casket engaging roll at its top side offset with respect to the table axis, the lower portions of the turn tables including the supporting rolls being countersunk below the surface of car floor.

In testimony whereof I have hereunto signed my name to this specification.

SYDNEY PAUL.